US012791007B2

(12) United States Patent
Kang et al.

(10) Patent No.: US 12,791,007 B2
(45) Date of Patent: Nov. 10, 2026

(54) HYBRID RENEWABLE ENERGY SYSTEM

(71) Applicant: MORGAN STATE UNIVERSITY, Baltimore, MD (US)

(72) Inventors: Dong Hee Kang, Lutherville Timonium, MD (US); Erjon Rembeci, Parkville, MD (US); Enrique Pajardo, Baltimore, MD (US)

(73) Assignee: MORGAN STATE UNIVERSITY, Baltimore, MD (US)

( * ) Notice: Subject to any disclaimer, the term of this patent is extended or adjusted under 35 U.S.C. 154(b) by 0 days.

(21) Appl. No.: 19/066,355

(22) Filed: Feb. 28, 2025

(65) Prior Publication Data

US 2025/0270980 A1 Aug. 28, 2025

Related U.S. Application Data

(60) Provisional application No. 63/558,669, filed on Feb. 28, 2024.

(51) Int. Cl.

| | |
|---|---|
| ***F03D 9/00*** | (2016.01) |
| ***F03D 9/11*** | (2016.01) |
| ***F03D 9/25*** | (2016.01) |
| ***H02S 10/12*** | (2014.01) |
| ***H02S 10/20*** | (2014.01) |
| ***H02S 40/32*** | (2014.01) |

(52) U.S. Cl.
CPC ................ *F03D 9/007* (2013.01); *F03D 9/11* (2016.05); *F03D 9/255* (2017.02); *H02S 10/12* (2014.12); *H02S 10/20* (2014.12); *H02S 40/32* (2014.12); *F05B 2220/706* (2013.01); *F05B 2220/708* (2013.01)

(58) Field of Classification Search
CPC . F03D 9/007; F03D 9/11; F03D 9/255; H02S 10/12; H02S 10/20; H02S 40/32; F05B 2220/706; F05B 2220/708
See application file for complete search history.

(56) References Cited

U.S. PATENT DOCUMENTS

2011/0215583 A1* 9/2011 Lee .......................... F03D 15/10 290/55
2014/0265598 A1* 9/2014 Isabella ..................... F03D 9/25 416/146 R

* cited by examiner

*Primary Examiner* — Viet P Nguyen
(74) *Attorney, Agent, or Firm* — Whiteford, Taylor & Preston LLP; Peter J. Davis

(57) ABSTRACT

A power generation apparatus having wind turbine blades connected to a center hub, the surfaces of the wind turbine blades having solar panels affixed thereto. A turbine drive shaft is connected to the center hub, and the turbine drive shaft and center hub are configured to rotate about the longitudinal of the turbine drive shaft as the wind turbine blades are turned by the wind. A hollow slip ring is mounted to the turbine drive shaft, and solar power cables transmit power from the solar panels to the hollow slip ring. The hollow slip ring transmits power from the solar power cables to a solar power transmission cable which extends to a solar panel power inverter. The apparatus also includes an electricity generator with a generator drive shaft coupled to the turbine drive shaft so that turning of the turbine drive shaft drives the generator drive shaft to generate electricity.

10 Claims, 5 Drawing Sheets

HYBRID RENEWABLE ENERGY SYSTEM

FIELD OF THE INVENTION

The invention is a device to generate electricity or heat.

BACKGROUND OF THE INVENTION

Renewable energy is one of the most effective tools against climate change. Sunlight and wind are constantly being replenished and plentiful, but wind and solar resources are not constantly available and predictable; they are referred to as intermittent energy resources.

RELATED ART

Among prior art, U.S. Pat. Nos. 5,254,876, 6,097,104, 6,372,978, 8,330,296 describe their version of a hybrid solar/wind system, however with different attributes. U.S. Pat. No. 10,526,056 describes a combination wave motion/solar/wind turbine system. The physical design of this invention differs markedly from other inventions that combine various materials to produce hybrid systems.

SUMMARY OF THE INVENTION

The present invention is a continuous energy producing system, using sunlight and wind during the day and wind at night and on cloudy days. A hybrid combined renewable power generation apparatus is provided characterized by wind turbine blades connected to a center hub in which the surfaces of the wind turbine blades have solar panels affixed thereto. A turbine drive shaft is connected to the center hub, and the turbine drive shaft and center hub are configured to rotate together about the longitudinal of the turbine drive shaft as the wind turbine blades are turned by the wind. A hollow slip ring is mounted to the turbine drive shaft, and solar power cables transmit power from the solar panels to the hollow slip ring. The hollow slip ring transmits power from the solar power cables to a solar power transmission cable that extends to a solar panel power inverter. The apparatus also includes an electricity generator with a generator drive shaft coupled to the turbine drive shaft so that turning of the turbine drive shaft drives the generator drive shaft to generate electricity.

Accordingly, there is provided according to the invention a power generation apparatus comprising:

a. a plurality of wind turbine blades connected to a center hub,
b. a plurality of solar panels, each of the plurality of solar panels affixed to a surface of one of the plurality of wind turbine blades,
c. a turbine drive shaft connected to the center hub, the turbine drive shaft and center hub configured to rotate about a longitudinal axis of the turbine drive shaft as the wind turbine blades rotate about the longitudinal axis,
d. a hollow slip ring mounted to the turbine drive shaft,
e. a plurality of solar power cables, each one configured to transmit power from a respective solar panel along a respective wind turbine blade to the hollow slip ring,
f. wherein the hollow slip ring is configured to transmit power from the solar power cables to a stationary solar power transmission cable,
g. wherein the solar power transmission cable extends from the hollow slip ring down along the turbine drive shaft to a solar panel power inverter,
h. the power generation apparatus further including an electricity generator having a generator drive shaft, wherein the generator drive shaft is coupled to the turbine drive shaft and configured to rotate as the hollow turbine draft shaft rotates, and
i. wherein rotation of the generator drive shaft causes the electricity generator to generate electricity.

According to various embodiments of the invention, the power generation apparatus may include a stationary frame, atop which rests the center hub. The electricity generator may be attached to the stationary frame. The center hub may include a housing for the hollow slip ring. The wind turbine blades may be curved and/or vertically oriented. The solar panels are preferably flexible and may be made of a flexible film to conform to a shape of the wind turbine blades. According to a preferred embodiment, the turbine drive shaft is hollow and the stationary solar power transmission cable passes through the center of the turbine drive shaft. Power generated by the hybrid renewable power generation system of the invention may be passed directly to a local, regional or national power grid, or may be stored in a power storage system.

Figure 1:
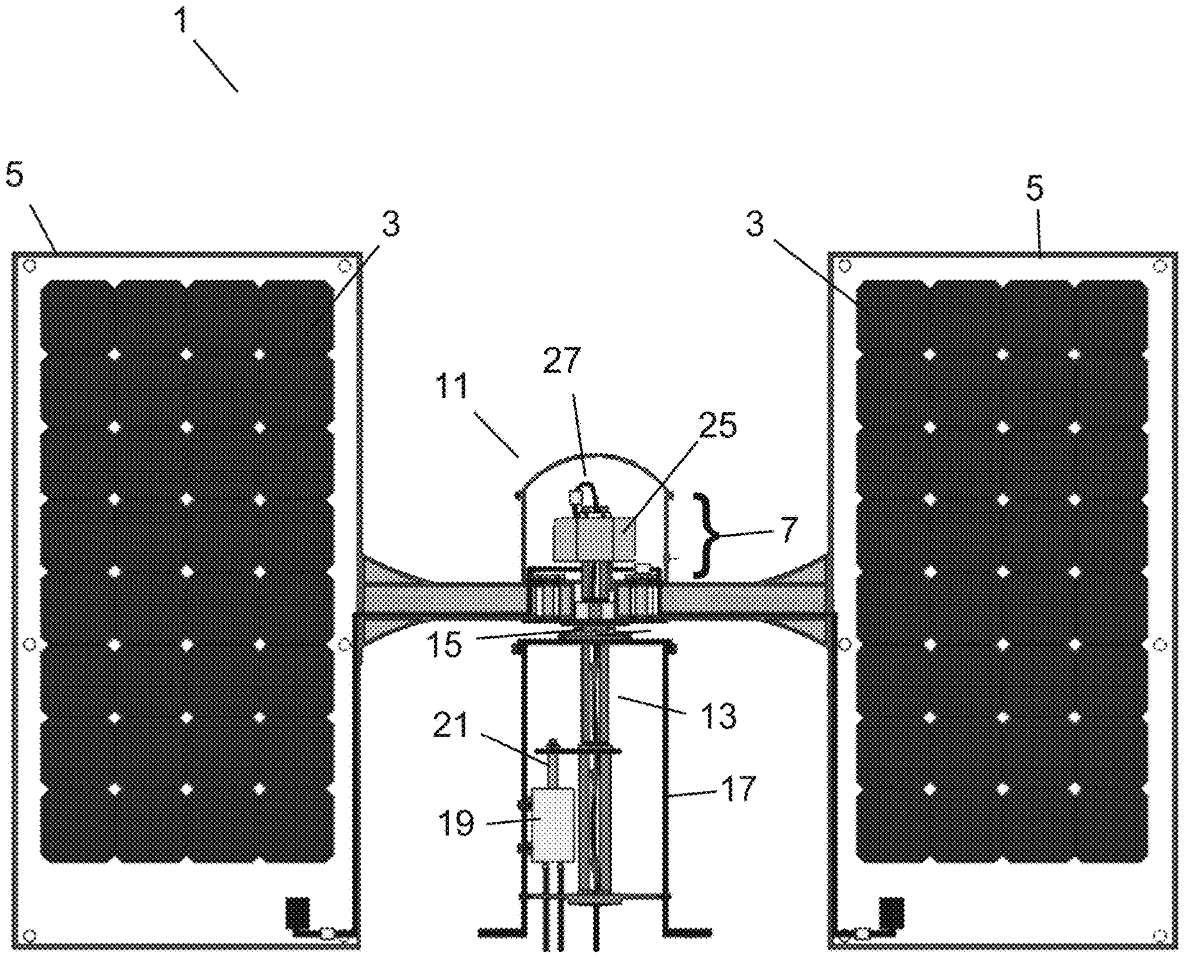
FIG. 1 is a side view of a wind/solar hybrid renewable energy system according to an embodiment of the invention with cutaway views of a supporting frame and a top housing.
Figure 2:
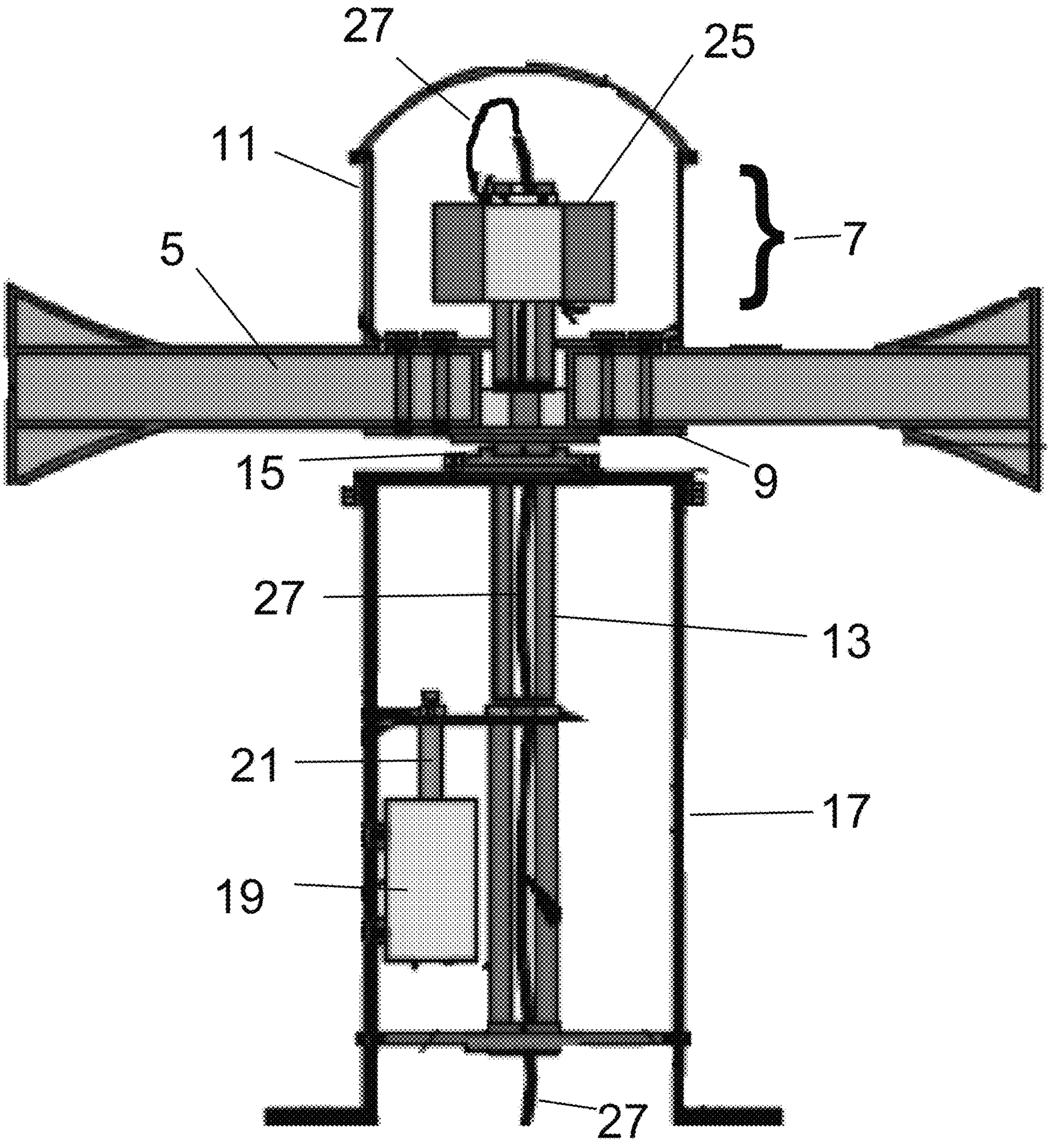
FIG. 2 is a closeup of a central portion of FIG. 1.
Figure 3:
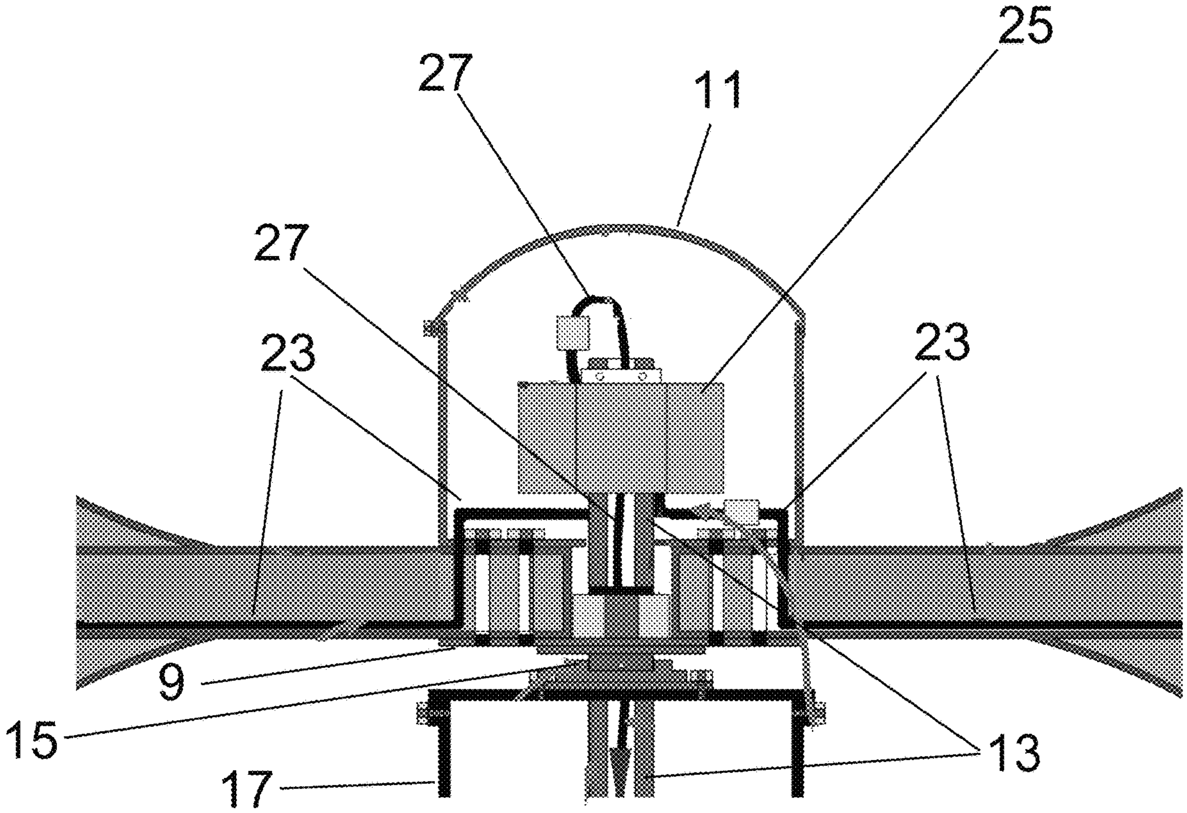
FIG. 3 is a tighter closeup of FIG. 1.
Figure 4:
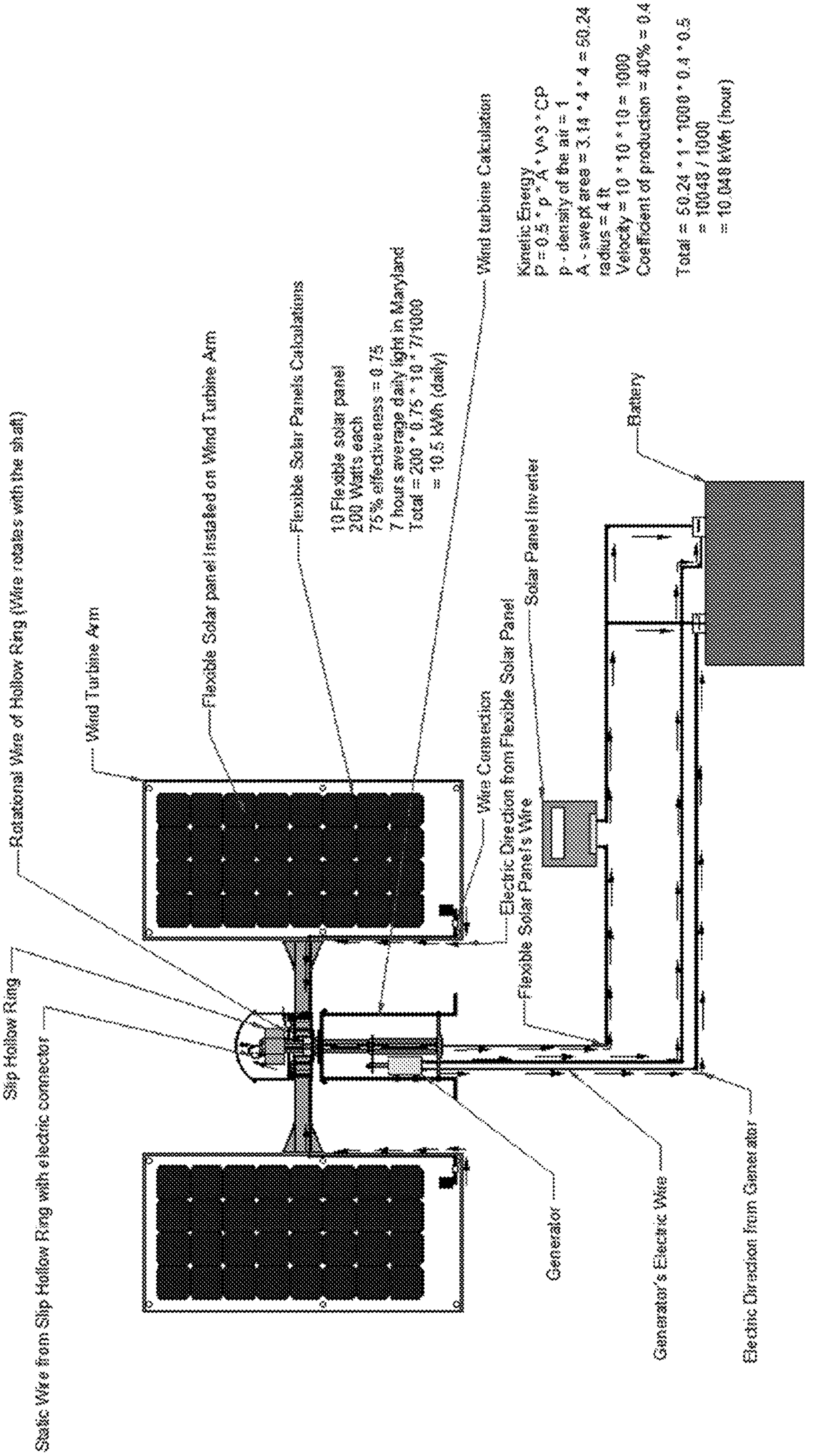
FIG. 4 is a representation of a wind/solar hybrid renewable energy system connected to a battery storage system according to an embodiment of the invention.
Figure 5:
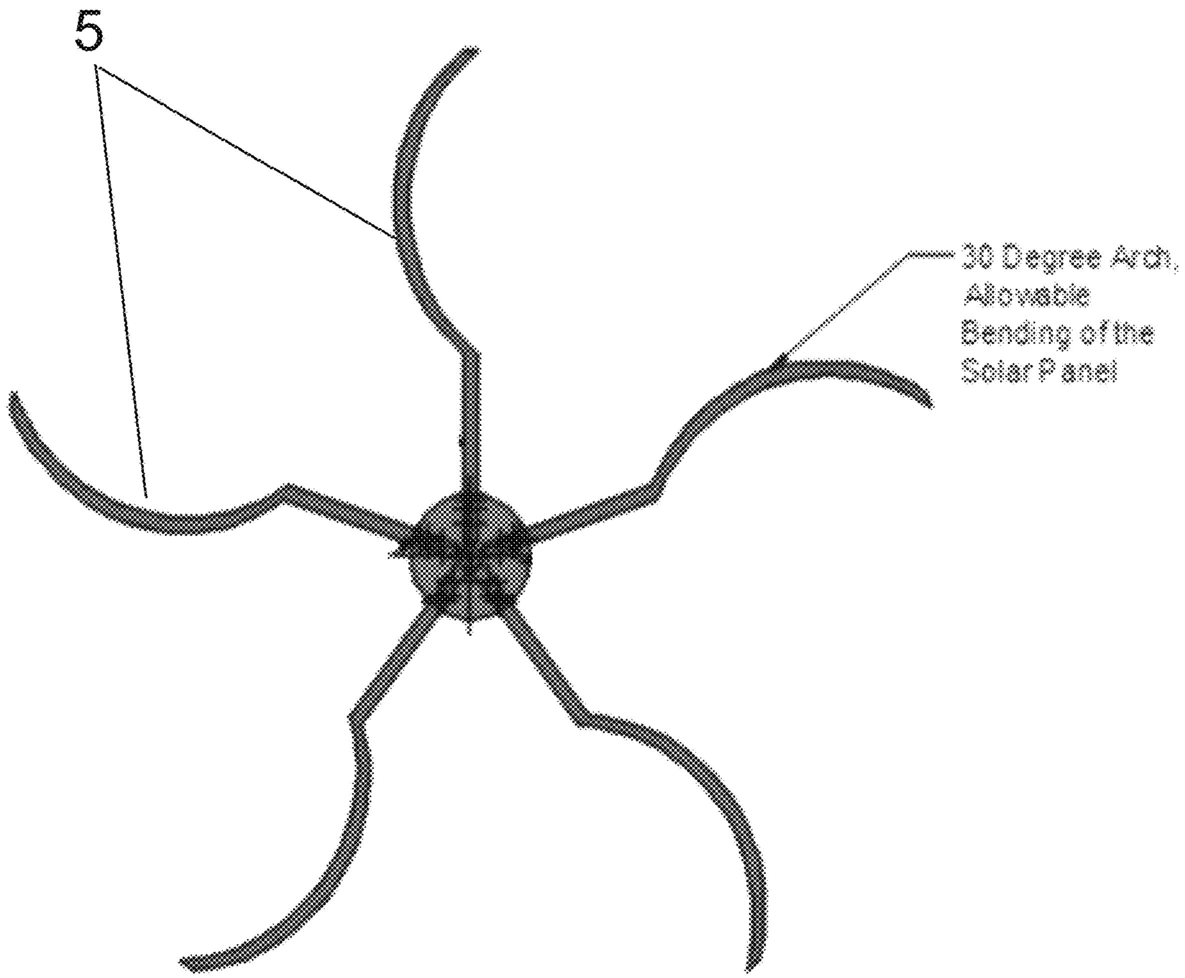
FIG. 5 is an overhead view of a five-arm wind wind/solar hybrid renewable energy system according to an embodiment of the invention.

Features in the attached drawings are numbered with the following reference numerals:

1 Hybrid renewable energy apparatus
3 Solar panels
5 Wind turbine blades
7 Center hub
9 Bottom plate
11 Top housing
13 Main shaft cable
15 Flange pillow bearing
17 Wind turbine frame
19 Generator
21 Generator drive shaft
23 Solar panel power cables
25 Hollow slip ring
27 Stationary solar power transmission

DETAILED DESCRIPTION OF A PREFERRED EMBODIMENT

Referring to the figures, the following is a description of an illustrative embodiment of the invention. According to the illustrative embodiment of the hybrid renewable energy apparatus 1 described herein, solar panels 3 are installed on wind turbine blades 5. According to a preferred embodiment, the wind turbine blades may be curved and may be oriented generally vertically. The solar panels 3 may be made of flexible film in order to conform to the shape of the wind turbine blades. Devices according to the invention may have as few as two or three wind turbine blades or it may have four, five or more wind turbine blades, depending on prevailing wind conditions. The wind turbine blades 3 may be attached to a center hub 7 which may comprise bottom plate 9 and top housing 11 between which the necks of the wind turbine blades 5 may be sandwiched using conventional fasteners. The bottom plate 9 of center hub 7 is fixedly connected to the main shaft 13, and rests atop flange pillow bearing 15 which allows for the free rotation of the center hub and main shaft 13 as the wind turbine blades are turned by the wind. Flange pillow bearing 15 rests atop wind turbine frame 17.

Generator 19 has a generator drive shaft 21 coupled to main shaft 13 so that drive shaft 21 is caused to rotate when main shaft 13 is rotated. The coupling may be via gears, belts or any other type of coupling. Rotation of generator drive shaft 21 under power of main shaft 13 causes the generator 19 to generate electricity. The generator 19 is preferably installed inside of the wind turbine frame 17 to minimize loss of kinetic energy due to long-distance coupling. Electricity generated by generator 19 due to rotation of main shaft 13 when wind turbine blades are turned by the wind may provide power directly to a power grid or may be stored in batteries and/or other energy storage devices.

The solar panels 3 produce energy from sunlight. Energy produced by solar panels 3 travels along the wind turbine blades 5 through solar panel power cables 23. Solar panel power cables 23 are connected to a rotating portion of hollow slip ring 25 attached to the outside of main shaft 13 inside of top plate housing 11. The top housing 11 may have a removable or openable top cap for accessing the hollow slip ring. Power is transmitted across the rotating interface of the hollow slip ring to stationary solar power transmission cable 27. According to one embodiment, main shaft 13 is hollow, and stationary solar power transmission cable 27 passes through the open top of main shaft 13, down through main shaft 13 to solar panel power inverter and then to a power grid and/or to an energy storage system, such as a battery bank.

Hybrid renewable power generation systems according to the invention can produce power using solar energy and wind energy alternately, or both solar and wind energy simultaneously.

The invention claimed is:

1. A power generation apparatus comprising:

a. a plurality of wind turbine blades connected to a center hub, wherein said center hub comprises a bottom plate and a top housing, necks of said plurality of wind turbine blades sandwiched between said bottom plate and said top housing, b. a plurality of solar panels, each one of said plurality of solar panels affixed to a surface of one of said plurality of wind turbine blades, c. a turbine drive shaft connected to the center hub, the turbine drive shaft and center hub configured to rotate about a longitudinal axis of the turbine drive shaft as the plurality of wind turbine blades rotate about said longitudinal axis, d. a hollow slip ring mounted to said turbine drive shaft inside said top housing, e. a plurality of solar power cables, each one of said plurality of solar power cables configured to transmit power from a respective one of said plurality of solar panels along a respective one of said wind turbine blades and to a rotating portion of said hollow slip ring, f. said hollow slip ring configured to transmit power from said plurality of solar power cables across a rotating interface of said hollow slip ring to a solar power transmission cable, said solar power transmission cable extending from said hollow slip ring down along said turbine drive shaft to a solar panel power inverter, g. said power generation apparatus further comprising an electricity generator having a generator drive shaft, said generator drive shaft coupled to said turbine drive shaft and configured to rotate as said turbine drive shaft rotates, wherein rotation of said generator drive shaft causes said electricity generator to generate electricity.

2. A power generation apparatus according to claim 1, further comprising a stationary frame, said center hub attached to an end of said stationary frame by a flange pillow bearing disposed between said center hub and said stationary frame, said flange pillow bearing allowing free rotation of said center hub and said turbine drive shaft.

3. A power generation apparatus according to claim 2, said electricity generator disposed within said stationary frame.

4. A power generation apparatus according to claim 1, wherein said center hub comprises a housing for said hollow slip ring.

5. A power generation apparatus according to claim 1, wherein said wind turbine blades are curved.

6. A power generation apparatus according to claim 1, wherein said wind turbine blades are vertically oriented.

7. A power generation apparatus according to claim 1, wherein said solar panels are flexible.

8. A power generation apparatus according to claim 1, wherein said solar panels conform to a shape of said wind turbine blades.

9. A power generation apparatus according to claim 1, wherein said turbine drive shaft is hollow.

10. A power generation apparatus according to claim 1, further comprising one or more batteries configured to store power generated by said solar panels and/or said electricity generator.

* * * * *